(12) United States Patent
Kamdar et al.

(10) Patent No.: US 10,296,506 B2
(45) Date of Patent: May 21, 2019

(54) NOTIFYING USERS OF AVAILABLE SEARCHED DOMAIN NAMES

(71) Applicant: Go Daddy Operating Company, LLC, Scottsdale, AZ (US)

(72) Inventors: Tapan Kamdar, San Jose, CA (US); Charles Beadnall, San Mateo, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 977 days.

(21) Appl. No.: 14/591,778

(22) Filed: Jan. 7, 2015

(65) Prior Publication Data

US 2016/0196300 A1   Jul. 7, 2016

(51) Int. Cl.
| | |
|---|---|
| *G06F 17/30* | (2006.01) |
| *G06F 16/245* | (2019.01) |
| *G06Q 30/02* | (2012.01) |
| *G06F 16/22* | (2019.01) |
| *H04L 29/12* | (2006.01) |
| *H04L 12/58* | (2006.01) |

(52) U.S. Cl.
CPC ........... *G06F 16/245* (2019.01); *G06F 16/22* (2019.01); *G06F 17/30312* (2013.01); *G06F 17/30424* (2013.01); *G06Q 30/0206* (2013.01); *H04L 61/302* (2013.01); *H04L 51/046* (2013.01)

(58) Field of Classification Search
CPC combination set(s) only.
See application file for complete search history.

(56) References Cited

U.S. PATENT DOCUMENTS

| | | |
|---|---|---|
| 6,332,158 B1 | 12/2001 | Risley et al. |
| 6,560,634 B1 | 5/2003 | Broadhurst |
| 6,876,997 B1 | 4/2005 | Rorex et al. |
| 6,895,430 B1 | 5/2005 | Schneider |
| 7,188,138 B1 | 3/2007 | Schneider |
| 7,606,858 B2 | 10/2009 | King et al. |
| 7,689,458 B2 | 3/2010 | Heckerman et al. |
| 8,065,300 B2 | 11/2011 | Gupta et al. |
| 8,489,746 B2 | 7/2013 | Nicks et al. |
| 8,706,728 B2 | 4/2014 | Nicks et al. |
| 2002/0194373 A1 | 12/2002 | Choudhry |
| 2003/0149690 A1 | 8/2003 | Kudlacik et al. |
| 2004/0199520 A1 | 10/2004 | Ruiz et al. |

(Continued)

OTHER PUBLICATIONS

Google SafeSearch Filtering (http://web.archive.org/web/20030702191745/http://www.google.com/intl/en/help/customize.html), Jul. 2003, WaybackMachine.

(Continued)

*Primary Examiner* — Shyue Jiunn Hwa
(74) *Attorney, Agent, or Firm* — Quarles & Brady LLP

(57) ABSTRACT

Systems and methods of the present invention provide for one or more server computers communicatively coupled to a network and configured to: receive a search for a domain name; query a domain name registration record to determine an availability status of the domain name; if the domain name is unavailable, store the domain name in association with the user data record and a search date; determine whether a change in the availability status has occurred; and if so, determine whether the duration of time since the search date has passed; and if not, transmit to the contact a notice of the change in the availability status.

20 Claims, 4 Drawing Sheets

(56) References Cited

U.S. PATENT DOCUMENTS

| | | |
|---|---|---|
| 2005/0125451 A1 | 6/2005 | Mooney |
| 2006/0004784 A1 | 1/2006 | Ableman et al. |
| 2006/0101155 A1 | 5/2006 | Damour et al. |
| 2006/0106793 A1 | 5/2006 | Liang |
| 2006/0218303 A1 | 9/2006 | Adelman et al. |
| 2006/0235824 A1 | 10/2006 | Cheung et al. |
| 2007/0112950 A1 | 5/2007 | Parsons |
| 2007/0198495 A1 | 8/2007 | Buron et al. |
| 2007/0299815 A1 | 12/2007 | Starbuck et al. |
| 2008/0005127 A1* | 1/2008 | Schneider ......... H04L 29/12594 |
| 2008/0010365 A1* | 1/2008 | Schneider ............ G06Q 10/109 |
| | | 709/223 |
| 2008/0016142 A1 | 1/2008 | Schneider |
| 2008/0040329 A1 | 2/2008 | Cussen et al. |
| 2008/0133580 A1 | 6/2008 | Wanless et al. |
| 2008/0222125 A1 | 9/2008 | Chowdhury |
| 2009/0006351 A1 | 1/2009 | Stephenson et al. |
| 2009/0241066 A1 | 9/2009 | Costello |
| 2009/0292696 A1 | 11/2009 | Shuster |
| 2010/0070448 A1 | 3/2010 | Omoigui |
| 2011/0055248 A1 | 3/2011 | Consuegra et al. |
| 2011/0125830 A1 | 5/2011 | Adelman |
| 2011/0125831 A1 | 5/2011 | Adelman |
| 2011/0208513 A1 | 8/2011 | Nicks et al. |
| 2011/0208723 A1 | 8/2011 | Nicks et al. |
| 2013/0238496 A1* | 9/2013 | Monster ................. G06Q 20/06 |
| | | 705/40 |
| 2014/0032589 A1 | 1/2014 | Styler et al. |
| 2014/0123301 A1* | 5/2014 | Kaliski, Jr. ......... G06F 21/6263 |
| | | 726/26 |

OTHER PUBLICATIONS

EstiBot.com User's Guide, Feb. 4, 2010, pp. 1-22.
Nameboy Ultimate Domain Name Generator, search, creation, domain name lookup and domain registration, Oct. 22, 2008 pp. 1-2.
Ohman, Watch Me Hand Register Keyword .com Domains Worth More than $100, Feb. 21, 2009, pp. 1-5.
Information retrieval—Wikipedia, the free encyclopedia, Nov. 10, 2009, pp. 1-8.
Laidlaw, What's Your Web Site Worth, May 7, 2008, pp. 1-22.
"Domain Name Search." Jan. 31, 2001. www.domainsearch.com.
MapQuest Online Mapping Software as seen on Apr. 16, 2009.

* cited by examiner

NOTIFYING USERS OF AVAILABLE SEARCHED DOMAIN NAMES

FIELD OF THE INVENTION

The present inventions generally relate to the field of domain names and specifically to the field of notifying interested users when a searched domain name becomes available for registration or purchase.

SUMMARY OF THE INVENTION

The present invention provides systems and methods comprising one or more databases communicatively coupled to a network and comprising a user id, a user contact associated with the user id, and a duration of time. The disclosed systems and methods may also comprise one or more server computers communicatively coupled to a network and configured to: receive a search for a domain name; query a domain name registration record to determine an availability status of the domain name; responsive to a determination that the availability status of the domain name is unavailable, store the domain name in association with the user data record and a search date; determine whether a change in the availability status has occurred; and responsive to a determination that the change in the availability status has occurred, determine whether the duration of time since the search date has passed; and responsive to a determination that the duration of time since the search date has not passed, transmit to the contact a notice of the change in the availability status.

The present invention may also provide systems and methods comprising a database communicatively coupled to a network and comprising: a contact data associated with a registrant of a domain name; a domain name search log comprising at least one search for the domain name; a database flag indicating that the domain name registrant has elected to receive a notice of a status change about the domain name. The disclosed systems and methods may also comprise one or more server computers communicatively coupled to the network and configured to: receive the at least one search; generate the notice comprising: the at least one search; at least one unsolicited offer for the domain name; or a valuation of the domain name based on the at least one search or the at least one unsolicited offer; identify the contact data in the database; and transmit the notice to the registrant via the contact data.

The above features and advantages of the present invention will be better understood from the following detailed description taken in conjunction with the accompanying drawings.

DETAILED DESCRIPTION

Figure 1:
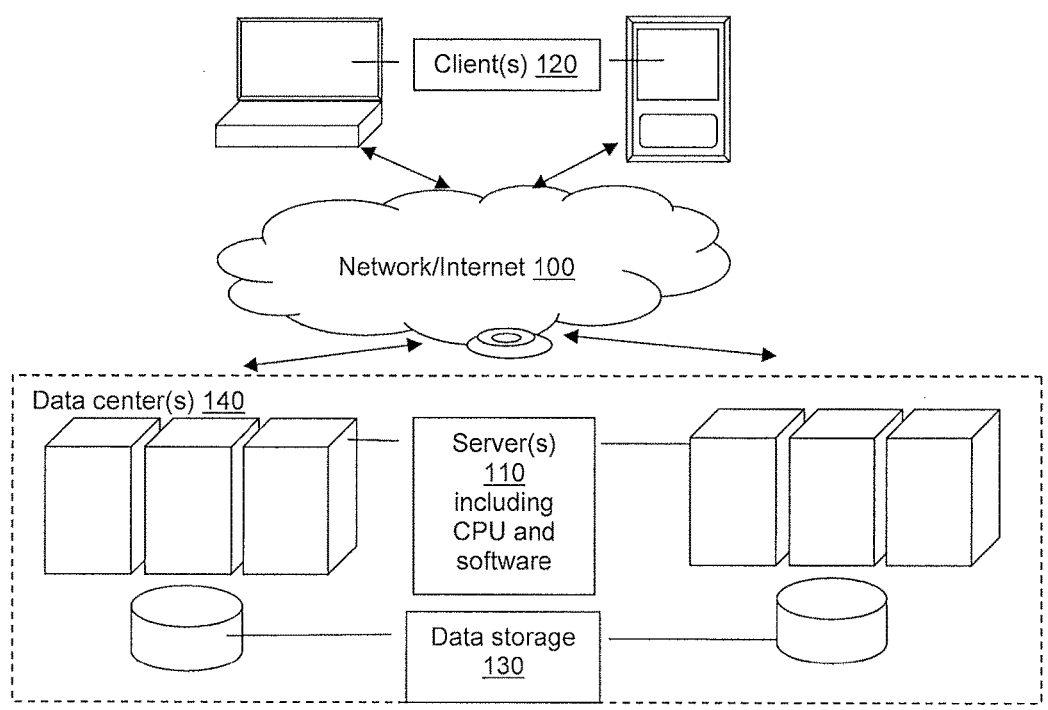
FIG. 1 illustrates a possible system for notifying users of notifying interested users when a searched domain name becomes available for registration or purchase.

The present invention will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses.

As the Internet has grown in size and influence, Domain names have become a digital asset with significant financial value. Because of this, users seeking to register domain names may put a great deal of effort into trying to find the ideal domain name. Many users will search domain names with a specific Top Level Domain (TLD—e.g., .com) and/or Second Level Domain (SLD—e.g., "example" in the domain name example.com) that they want to register.

Customer perception continues to reflect an outlook that ".com is king." Domain name search records continue to confirm that .com TLDs are especially popular and continue to dominate domain name registrations.

Users may search for domain names out of curiosity, or may have seen suggestions for available domain names that trigger ideas for additional domain name searches for the user. Users will often search for domain names via domain name search tools such as a text box that receives a domain name search string from the user. These domain name search tools may be available as part of a domain name search software interface, possibly found on a registrar or other domain name services website.

If the domain name a user searches is not available, users will often continue to use the search tools for searching alternative domain names, including SLDs and TLDs for related domain names, despite the fact that domain name registrars and other domain name search services often provide suggestions for similar or related domain names.

Roughly 65% of searches today result in the user not finding the available domain name that they originally searched. Domain names may be unavailable for a variety of reasons. For example, the domain name may resolve to an existing website using the domain name. A domain name registrant may also have registered the domain name to monetize it, possibly via a parked web page. The domain name registrar may also anticipate selling the registered domain name on a domain name aftermarket. In some instances, the domain name registrant may have registered the domain name, but has no interest in pursuing any options for the domain name.

The high unavailability of domain names may cause users to search for domain names an average of 4-5 times before they find a domain name to register that fits their needs. The high end of this average may be as many as 10-12 searches before the user finds an acceptable domain name.

Over time, unavailable domain names may become available because of disuse, where a registrant drops a domain name or allows it to expire. A domain name drop list may comprise a list containing expired domain names soon to be deleted from a domain name registry, and may be used to identify expiring domain names with value.

Unavailable domain names may also become available because the domain name registrant wishes to sell the domain name at auction in a domain name aftermarket. Domain name aftermarkets may comprise any secondary market for domain names. Parties in a domain name aftermarket may register bids or negotiate prices to transfer registration from the registered holder to a new registered holder of that domain name.

Applicant has identified multiple weaknesses in presently existing systems and methods, which do not effectively leverage records generated from domain name searches to provide feedback to the searching user that the searched domain name is now available for registration. Applicant has therefore determined that optimal systems and methods will utilize such data from domain name searches to alert searching users that previously-searched domain names have become available.

To accomplish this, the disclosed system may receive domain name searches from a user and track the user, as well as the user's domain name searches for specific domain names, in a database. Each tracked search stored in the database may include an identifier for the user that searched the domain name, the domain name or keywords searched, and the date of the search. The system may then aggregate all searches for the user, as well as all searches for all users, and store these searches in data storage. The data storage may also store a duration of time, explained below.

The disclosed system may also monitor and track domain names that become available through being dropped, becoming expired and/or becoming available on a domain name aftermarket. The availability of the domain name through these means may automatically trigger a notice to be sent to the interested user informing them of the availability of their searched domain name. However, before sending the notice, the system may determine if the duration of time stored in the database has passed. If the duration of time has not passed, the system may send the notice to a contact for the interested user, stored in data storage. In some embodiments, a more permanent solution may exist where, regardless of the duration of time that has passed, the interested user may still receive notice if a domain name has become available.

Current domain name registrants may be interested in selling one or more domain names in their domain name portfolio, possibly by listing the domain names in a domain name aftermarket, but may be hesitant to do so because of their perception that there is no interest in the domain name, or if there is interest, that the bids received in the domain name aftermarket would be lower than the registrant is willing to accept.

Likewise, current users interested in purchasing unavailable domain names may want to purchase specific unavailable domain names for a specific price, but if the domain name is not listed in a domain name aftermarket, may have no means to inform the current registrant of what they are willing to pay to acquire the domain name.

Consequently, Applicant has also identified multiple additional weaknesses in presently existing systems and methods for providing interested parties with means to contact the current registrant, and vice versa, to express their interest, submit bids, negotiate aftermarket sales via offers and counteroffers, etc. Presently existing systems and methods also do not provide such registrants with effective means to determine the expressed level of interest in domain names in the domain name registrant's portfolio, and/or to determine the price that interested parties would be willing to pay to acquire the domain names.

Applicant has therefore determined that optimal systems and methods will utilize data from domain name searches, user control panels and software logic to provide means both for a current registrant to select options to receive offers for registered domain names and for one or more users interested in one or more domain names to contact the current registrant of the domain name with offers for specific domain names, thereby providing the domain name registrant with information to determine a level of interest in one or more domain names, as well as a general price range interested parties are willing to pay for the domain name(s). The level of interest and the general price range may be used to calculate a valuation for the domain name. The domain name registrant may use this valuation to determine whether or not to list the domain name(s) in the domain name aftermarket.

To accomplish this, the disclosed system may generate, and transmit to a client for display, a user interface providing options for a current domain name registrant to provide contact information to receive domain name purchase offers. As the domain names are being searched, the software may determine if each searched domain name is available for registration and generate a domain name search log as disclosed herein.

If the domain name is not available, the software may search one or more domain name registration records to identify the current domain name registrant for the searched domain name, and any provided contact data associated with the registrant. If contact data for the domain name registrant is identified, the software may generate, and transmit to a client computer for display, a user interface allowing the party that searched the domain name to make an offer for the domain name. This offer, along with any other offers from users that searched the domain name, may be forwarded to the current registrant, if the registrant has selected the options to receive such notices.

The current registrant and interested user may then negotiate the sale of the domain name. Successful domain name transactions using this system may incentivize current domain name registrants to consolidate their current domain names into a consolidated portfolio and list the domain names more frequently on the domain name aftermarket. The user interface and software logic may be used to facilitate such listings in the domain name aftermarket.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

Figure 2:
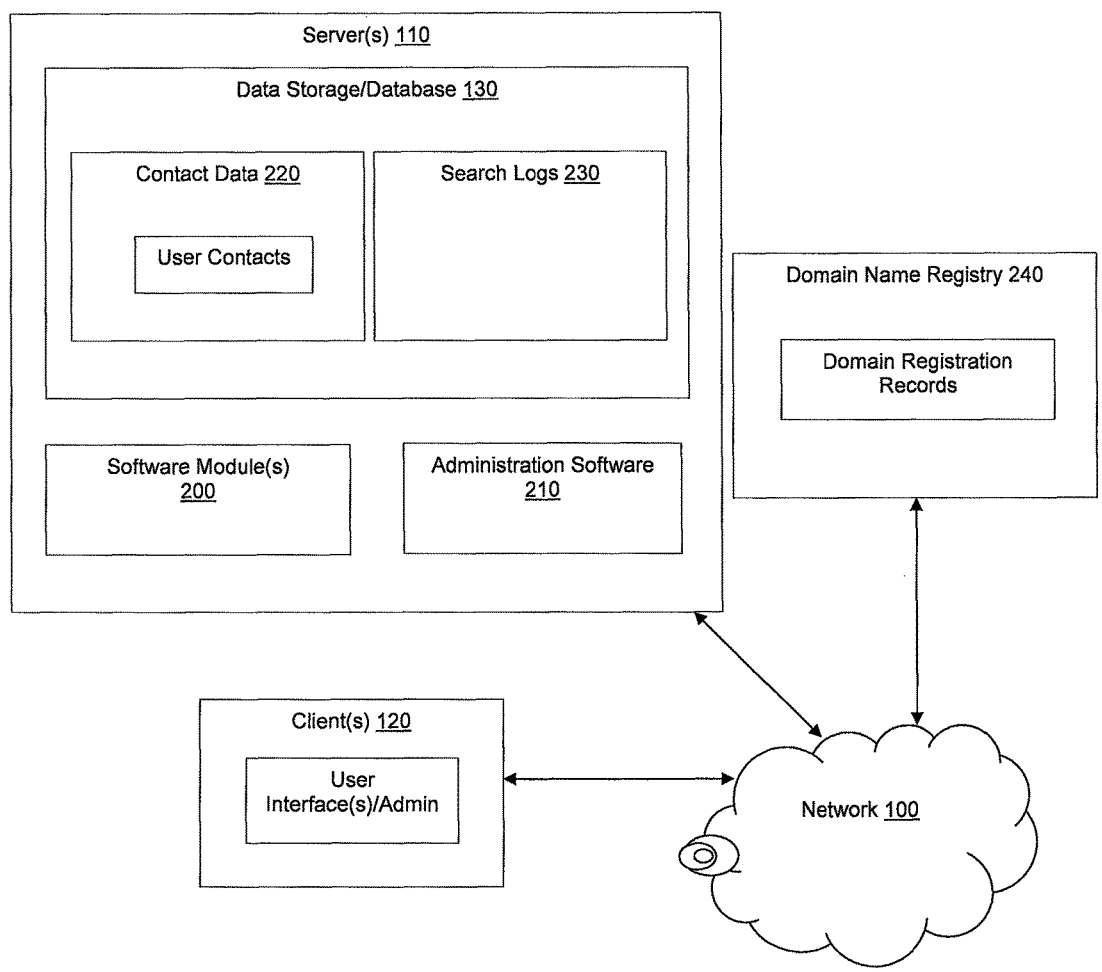
FIG. 2 illustrates a more detailed possible system for notifying interested users when a searched domain name becomes available for registration or purchase.

FIG. 2 shows a more detailed example embodiment of an environment for the systems, and for accomplishing the method steps, disclosed herein. As non-limiting examples, all disclosed software modules 200 may run on one or more server(s) 110 and may include one or more user interfaces generated by the server(s) 110 and transmitted to and displayed on the client(s) 120. The user interface(s) may be configured to receive input from the user and transmit this input to the server(s) 110 for the administration and execution of the software 200, using data in data storage 130 associated with the software modules 200. Thus, the disclosed system may be configured to execute any or all of the method steps disclosed herein.

Server(s) 110 may be hosted by any entity, possibly a hosting provider, a domain name registrar, a website development company, any other software service provider or any combination thereof. To manage users of such a system, including individuals or organizations, server(s) 110 may host and run a user administration program 210 such as GoDaddy's My Account control panel for management of hosting and domain names, as a non-limiting example.

In such an administration control panel program, or admin 210, each user may be assigned a user id. This user id may identify transactions performed by each user. These transactions may be stored as data records in data storage 130, each data record including the user id to associate the user with the transaction in data storage 130.

The data records may also store contact data 220 for each user, possibly including email, SMS, social media account data, etc. to contact the user for any contact purposes disclosed herein. In some embodiments, the user may select specific contacts as a means of contact for purposes of receiving notice as disclosed in the current invention.

The admin 210 may include a Domain Control Center (DCC) for administration of domain names registered to the user. As non-limiting examples, the DCC may include means for listing and managing all domain names registered to the registrant, possibly including auto renewal of the domains, DNS record settings, etc. In some embodiments, the DCC may be used to display the disclosed notices, reports and/or domain name purchase offers, as described in more detail herein.

The user may select settings from the admin 210 to control administration of the disclosed invention. In addition, software 200 running on server(s) 110 may analyze all transaction data received in association with any given user id (or with all transaction data received), calculate appropriate parameters for the administration of the disclosed invention, and/or may set calculated optimal default parameters, as discussed in detail below. Thus, any combination of user settings and/or software calculations for user parameters may be used to manage the disclosed invention.

One example parameter that may be set by the user in the administration interface and/or calculated by the software 200 may include the duration of time. As noted above, a user may only want to receive notices about available domain names they have searched during a specified period of time after searching them. Using the admin 210, the user may select this pre-determined duration of time during which they want to continue to receive notices about searched domain names that have now become available. After this duration of time has expired for each of the searched domain names, notices would no longer be sent to the user. However, as mentioned above, if the user would prefer to continue receiving notices of available domain names regardless of the duration of time that has passed, they may use the administration interface to indicate this option as well. In these embodiments, the notice will continue to be sent as long as the domain name is made available.

In other embodiments, software 200 may determine an average or optimal duration of time during which to continue sending notices of available searched domain names. Software 200 may utilize and analyze any available resources and data to determine patterns in the user's preferred duration of time, if applicable. As non-limiting examples, software 200 may analyze all records of time periods entered by the user over time and automatically set the duration of time as an average or a longest of the user's entered time periods.

In other embodiments, software 200 may analyze user search logs 230, possibly by identifying these logs 230 according to a user id, and cross-reference them with user registration records to determine the length of time between the search for each domain name and the registration of the searched domain name. The system may then calculate the average of this length of time and/or identify the longest length of time for all domain names searched and registered by the user. The system may then automatically set the duration of time to either the average of the length of time for all domain name searches/registrations or the longest length of time identified, if applicable.

In other embodiments, software 200 may analyze all user search logs 230 and cross-reference them with all user registration records to determine the length of time between the search for each domain name and the registration of each searched domain name. Software 200 may then calculate the average of this length of time and/or identify the longest length of time for all domain names searched and registered by all users. Software 200 may then automatically set the pre-determined length of time to either the average of the length of time for all domain name searches/registrations or the longest length of time identified.

Additional example parameters that may be set by the user in the administration interface and/or calculated by software 200 may include parameters to determine the amount and format of notices sent to the user. In some embodiments, rather than searching a domain name as a single text string, the user may search one or more keywords to determine available domain names.

For example, a user may search "Scottsdale" with "attorney" or "lawyer" to identify available domain names containing, synonymous with, or related to these keywords (e.g., scottsdalelawyer.com is synonymous with scottsdale-attorney.com). Software 200 on server(s) 110 may generate and transmit a notice when domain names containing the searched or synonymous words become available.

However, depending on the number of domain name searches and the number of possible matches available, the user could become inundated with notices so that none of the notices are useful to the user. To avoid such inundations, the user may set, or the software 200 may calculate, an optimal amount and format for available domain name notices, according to any of the following disclosed parameters (possibly as a range of acceptable parameters) and/or data aggregated in association with individual users (i.e., associated with a user id) or with all users, as disclosed above.

Such parameters may include: previous domain names searched and registered by the user; the total number of these searches and registrations; the "token distance" between the domain names originally searched and the domain name ultimately registered; related or synonymous keywords within SLDs of related available domain names; the TLD associated with the domain name; the valuation/aftermarket price of related available domain names; any similar parameters or any combination thereof.

As a non-limiting example, the token distance between each of the following use cases would be a token distance of 1: "starwars" and "starwar" (dropped character), "starwars" and "estarwars" (added character), and "starwars" and "starwarz" (replaced character). The larger the token distance, the less relevance may apply in terms of the name being similar to the user's original query. The position of the change in characters may also influence the relevance of the similar suggestion. If token distances are minimal (as in the case of singular/plural words), the resulting suggestion may offer value which is very closely aligned with the original query. Hence, token distance under a algorithmically defined threshold (e.g., differs by language) would be leveraged to trigger notices.

The total number of domain names searched and registered by the user(s) may be one parameter analyzed in determining the amount and format of available domain name notices generated and transmitted to the user. Some users may search many different domain names on an hourly or daily basis, while other users may search only a few domain names occasionally, possibly with months between searches.

To accommodate both types of users, the administration interface may receive input from users selecting whether to receive an alert as each searched domain name becomes available, or to aggregate the available domain names that have become available during the designated time period into a single mass alert, a set of alerts or other summary of alerts sent at regular intervals (e.g., hourly, daily, weekly, monthly, etc.).

Software 200 may similarly analyze and apply data within domain name search logs 230 to make an automated determination whether a user should be sent a notice for each domain name that becomes available, or whether they should be sent a bulk notice, possibly including a set, list and/or a summary of notices including all notices for the designated duration of time (e.g., daily, weekly, monthly, etc.), if applicable.

Software 200 may make this determination based on domain name searches performed and/or domain names registered by each user individually, and/or the users collectively. In these embodiments, software 200 may track these activities for a particular user id. If the user associated with the user id performs many searches and/or registers many domain names, the disclosed software algorithms and logic may determine that the user would prefer a bulk notice listing all available domain name notices in a single communication.

However, If the user associated with the user id performs relatively few searches and registers relatively few domain names, the disclosed software algorithms and logic may determine that the user would prefer an individual notice for each searched domain name that becomes available.

The user's past domain name search and registration history may be another parameter in determining the amount and format of available domain name notices generated and transmitted to the user. In some embodiments, the user's domain name searches may be aggregated from the domain name search log 230 and domain name registration records associated with the user, possibly according to the user id. The results of these aggregations may be displayed to the user, possibly as a specific page comprising an alert mechanism within a domain name control center within the admin 210 or within an email, with options to select the previously searched domain names that the user is specifically interested in learning about or registering If they become available.

In some automated embodiments, software running on server(s) 110 may use aggregated data to determine the user's interest and likelihood of registering available domain names. The user's domain name searches and/or registrations may be aggregated from the domain name search log 230 and/or domain name registration records respectively associated with the user id. The searched and/or registered domain names may be compared to determine a level of perceived importance to each user of each domain name.

These records may also be compared and analyzed on a more granular level to determine: the amount of time between the search and the registration; which domain names were registered with synonymous keywords; what domain names were registered in addition to the registered domain name on the same date; etc. These details may be used to calculate a prediction of the likelihood of the user registering a particular domain name in the future, and therefore, which notices, and in what format, should be generated and transmitted to the user.

The domain name search log 230 and/registration records may also be used to determine which TLDs may be considered valuable by the user and therefore which available domain names should trigger a notice to be sent to the user. For example, search logs 230 and/or domain name registration records associated with the user id may show that the user registers mostly .com TLDs.

Therefore, using the non-limiting example above, if the registration logs 230 show that the user has searched and/or registered scottsdalelawyer.com, the software logic may determine that the user is likely to consider scottsdalettorney.com as a valuable domain name suggestion and would therefore want to receive a notice that it has become available, while scottsdalelawyer.info or scottsdalelawyer.biz would be considered less valuable, reducing the likelihood that the user would want to receive a notice when they become available.

The software may likewise be configured to generate and transmit notices based on searches in the global search log 230. Software 200 may be include logic to compare and calculate this likelihood based on global search logs 230 and registration records to determine the most popular TLDs, and similarly determine that the most popular TLDs will be of value to the user, and therefore a high probability that the user would be interested in receiving notices for the most popular TLDs.

In other embodiments, the user may set their own parameters for which SLDs and TLDs are considered valuable, possibly via the admin 210 or email interfaces, and would therefore like to receive a notice when such SLDs or TLDs become available.

The domain name search log 230 and/or registration records may also be used to determine which price ranges may be considered valuable by the user, and therefore which available domain names should trigger a notice to be sent to the user. In other embodiments, the user may set their own parameters for which price ranges are considered valuable, possibly via the admin 210 or email interfaces, and would therefore like to receive a notices when domain names are available in the designated price range.

For example, search logs 230 and domain name registration records associated with the user id may show that the user registers mostly domain names in a specified price range. Therefore, any domain names significantly above this price range may be determined to be of little interest to the user.

Using the non-limiting example above, software 200 may analyze data within the domain name search log 230 and/or registration records associated with a user id and determine that scottsdalelawyer.co is listed for a very high price. Based on the previously established history for the user, software 200 may determine that very few non-.com domain names have been registered by the user, and that the user has not historically paid the amount for any domain names being asked for scottsdalelawyer.co. Software 200 may therefore determine that the user is not interested in receiving notices for scottsdalelawyer.co at the asked price.

In some embodiments, software on server(s) 110 may also crawl web pages to discover which of the registered domain names resolve to current active web pages. If the user has associated the domain names with active web pages, the software may conclude that the registered domain names are valuable to the user, and adjust the amount and format of available domain name notices accordingly.

Having established the user settings via the admin 210, or by software 200 having calculated an optimal default, the user may search for a desired domain name, possibly via the previously described search tool, available via the admin 210 or a registrar website, as non-limiting examples. The user may enter the domain name into a search tool and submit the search, which may then be transmitted to server(s) 110.

In some embodiments, rather than searching the entire domain name, the user may search one or more keywords to determine available domain names. In these embodiments, the keywords searched may also be stored in data storage 130, possibly as separate data records associated with the user id and/or a domain name search session. In some embodiments, a session may comprise all searches from entering the search tool to ending it.

Server(s) 110 may receive the domain name search string and search available registry 240 and zone files to determine if the domain name is available for registry. If the domain name is available, the user may register the domain name using any domain registration methods known in the art.

If server(s) 110 make a determination that the domain name is not available, a plurality of alternative domain name suggestions may be generated and transmitted to client(s) 120 for display to the user using any domain suggestion methods known in the art.

The user may then either select and register one of the suggested domain names, or may continue to search domain names using the domain search tool. In some embodiments, each of these searches may comprise a search string comprising the entire searched domain name. In other embodiments, the user may enter the SLD as a text string and select the desired TLD from a drop down, radio button, checkbox, etc.

Server(s) 110 may collect the data from domain name searches and generate a log 230 of all domain name searches performed. No limitations should be placed on the method of aggregating and/or generating this log 230. As non-limiting examples, the log 230 may comprise a text file capable of being parsed to identify relevant information, or may be stored as a plurality of data records in a database 130, each associated with a user id or session id.

The domain name search logs 230 generated by server(s) 110 may include any data collected from the user during a domain name search. As non-limiting examples, server(s) 110 may identify the user making the domain name search. In embodiments where the user is associated with a user id, the server may identify the search coming from this user id in order to track domain name searches from this user id.

The domain name search logs 230 may also include the domain name searched and the date the search was performed, as non-limiting examples. In embodiments using keywords searched by the user to find an available domain name, the domain name search logs 230 may also include the keywords used in the domain name search.

In embodiments that store the domain name search logs 230 as data records in data storage 130, the data records may each comprise data fields for the user id associated with the domain name search. Individual records may likewise contain data fields for the text strings and/or keywords used to search the domain name and the date of the domain name search.

Server(s) 110 may aggregate the domain name searches for individual users, as well as domain name searches for all users, into the domain name search log 230 used herein. It should be noted that although many domain name searches from many users may be aggregated into the final domain name search log 230, the distribution of a specific domain name across different users will be sparse, since it is unlikely that two different users will search for an identical domain name.

Server(s) 110 may also track domain name registration activity for each user associated with a user id in the system. This domain name activity may comprise data such as the name of the domain name registered, keywords associated with the domain name, the date the domain name was registered, etc. In some embodiments, the domain name registration data may be stored in data storage 130 as data records including or associated with a particular user id. This domain name registration data may be cross-referenced with the domain name search logs 230 to perform the analyses disclosed herein.

Server(s) 110 may be configured to track unavailable domain names as they become available. Such domain names may be come available as a domain name is dropped, becomes expired, or is offered on a domain name aftermarket by a current registrant of the domain name.

In some embodiments, the administrator of the system, such as GoDaddy, may be a domain name registrar, or may administrate a domain name aftermarket. In these instances, the administrator may have access to domain name registration records, user administration account records, domain name drop lists, domain name reseller administration account records, and/or available domain names as they become offered in the domain name aftermarket. The domain name registrar in these embodiments may cross-reference these available domain names with software 200 to generate the notices as disclosed.

Software 200 may compare the stored domain name search logs 230 with the received data to determine whether any of the searched domain names are now available for registration, possibly in the domain name aftermarket.

In some embodiments, the comparison may be a direct comparison of the available domain names with the domain names searched. As noted above, in other embodiments, the comparison may be based on keywords or synonyms of keywords. In these embodiments, software 200 may be configured to tokenize the available domain names, as well as the searched domain names. Software 200 may then compare each of the tokens in the available domain names with those in the searched domain names to identify common tokens.

As a non-limiting example, if the stored domain name search records indicate that a user searched "Scottsdale" and "lawyer," a notice may be sent to the user when the domain name scottsdalelawyer.com becomes available, recommending this domain name as with a high probably that the user will consider it a high value domain name.

In embodiments where the available domain names and the searched domain names are tokenized, a synonym dictionary or other resources may be searched to determine synonyms for the tokens. Notices may be augmented in these and similar embodiments to include notices for not only the searched domain names but also domain names containing the identified synonyms.

Using the non-limiting example above, a notice may be sent to the user when the domain name scottsdalelawyer.com becomes available, but may also be sent for the domain names scottsdaleattorney.com and/or scottsdalelawyer.attorney, recommending these domain name as with a high probably that the user will consider it a high value domain name.

Prior to sending the alert to the user that one or more of the domain names that they have searched are available for registration, server(s) 110 may analyze the factors listed above to determine whether or not to send the alert to the user.

An additional factor that software 200 may analyze in determining whether or not to send the notice to the user is whether or not the domain name has already been registered by the user. Because the user has previously searched the domain name, there is a good chance that the user has been monitoring the domain name and registered the domain name independently.

To avoid sending an alert to a user for an available domain name that they have already registered, software 200 may perform a secondary check on any available domain name records (e.g., zone files, domain aftermarket access, WHOIS, etc.), to ensure that the user or another user has not already registered the domain name that is the subject of the alert.

Thus, if a match is found between the domain names searched and the monitored available domain names, and if all threshold factors have been overcome in determining whether or not to send the notice, software 200 may generate the notice to transmit to the user that searched the matching domain name at any contacts associated with the searching user's user id.

The notice may comprise the domain name searched by the interested user, and may include a message that the searched name is now available. An email may be sent back to the customer informing them that the domain name is again available for immediate registration.

In some embodiments, domain name registration records may be searched to determine the availability of the searched domain names) and the results may be displayed on the user interface. Some of these embodiments may also include a display including a user interface for the interested user to contact the current registrant of the searched domain name with an offer to acquire the domain name.

During the domain name search by the interested party, if software determines that the domain name searched by the interested party is currently registered, the software may consult the stored domain name records to determine the current domain name registrant, and whether the current domain name registrant has opted into receiving domain name acquisition offers.

If the domain name registrant has opted into such offers, the software may generate, transmit and display to the interested party a user interface on the domain name search tool with an option to send an email of to the current registrant expressing interest in acquiring the domain name, and possibly an offer price for the domain name.

Embodiments such as these may apply to domain name registrants that have opted into receiving such domain name acquisition offers. In these embodiments, the DCC may display a list of all domain names currently registered to the registrant. For each of these domain names, the registrant may select the domain names, possibly via checkboxes displayed next to the listed domain names, to apply options for the domain names.

One example of such options applied to registered and selected domain names may include generating reports about the number of searches matching these domain names in the domain name search tool. Software 200 may utilize the aggregated search logs 230 described above to cross-reference the selected domain names against the listed and selected domain names.

Software may then monitor the selected domain names and as each search is received via the domain name search tool, that search may be added to a running total number of searches for that domain name. The report may include the total number, at the reporting interval, of searches for the selected domain names. In some embodiments, the reporting interval may be determined by a user setting in DCC, such as for hourly, daily, weekly, monthly reports, etc.

The report may be received by the registrar via the DCC or may be sent to any contact data, such as an email, SMS message, social media message, etc., associated with the domain name registrant. The report may be received according to the reporting interval set by the user as noted above.

The report may comprise each domain name searched in the search tool that is not available and matches a domain name for which a registrant has opted in to receive a report. Software 200 may keep a running total in data storage 130 of such matches. Software 200 may identify the reporting interval and identify the running total overall and/or the running total since the last reporting interval.

In some embodiments, the running total may include exact matches between the searched domain name and the domain names registered to the registrant. In some embodiments, the running total may be modified to include keyword searches that match domain names registered to the registrant.

The report may comprise: a listing of domain names, including those domain names listed on a domain name aftermarket and those domain names that are not listed on a domain name aftermarket; a summary of all traffic from interested parties searching the domain names; an estimated valuation of the domain names searched, based on the traffic searching the domain name(s); and the number of search results in which the domain name would have appeared if the domain name was listed on a domain name aftermarket, possibly interpreted as the number of customers that could be, but are not actually seeing the domain name.

The estimated valuation of the domain name(s) searched may be based on multiple factors including, but not limited to: similar names sold on the aftermarket; current open aftermarket listings; Google search trends on words in the domain name; current/past traffic volumes to a website associated with the domain name; a search engine optimization score; being white-listed by search engines (no adult/porn/spam content) and any other relevant factors.

A determination of a number of search results in which the domain name would have appeared if the domain name was listed on the domain name aftermarket may be based on multiple factors including, but not limited to: the number of times customers either search for the exact domain name, perform a WHOIS search on the exact domain name, and/or the number of times the domain name would have surfaced in the top N search results (but was effectively filtered out as it was not available).

Thus, based on the traffic and valuation of the domain names searched, the report may encourage the registrant to consolidate domain names into a single portfolio, and/or may identify which domain names that are currently not listed in the domain name aftermarket should be. To encourage participation in the domain name aftermarket for this searched domain name. The report may include a link or other access to a control panel, possibly the DCC, allowing the registrant to list the domain name in the aftermarket. Such control panels may include a selection to list the domain name and the pricing for the aftermarket.

In some embodiments, the control panel where the domain traffic from the search results is listed may also show the valuation for the domain name. In some embodiments, this valuation may be provided by a domain name aftermarket valuation service such as AFTERNIC. This valuation may give the registrant a view into what a realistic valuation may be, which would represent beneficial information for a registrant to consider setting a minimum price if they do choose to list their domain name in the domain name aftermarket.

In a non-limiting example, a user may receive a weekly email with a report identifying 30 different searches by 30 different customers coming from websites for three different geographical locations (e.g., customers searching from www.godaddy.com, uk.godaddy.com and india.godaddy.com). In this example, the report may identify an American market, a British market and an Indian market as three markets where exact matches were searched in traffic. The report may inform the domain name registrant that if these domain names had been listed in the domain name aftermarket, the domain name would have shown up 145 times in the search results.

In addition to receiving reports, options applied to registered and selected domain names may include selecting the domain names for which the registrant desires to receive offers for acquiring the selected domain names. In these embodiments, the registrant may be prompted to provide contact information to which such offers should be sent. This may be entered as each domain name is selected, or may use contact information associated in the database with the registrant, as non-limiting examples. Other options may be presented to the user to have such offers displayed in the DCC as notices.

To increase the options available to monetize the registrar's domain name, the registrant may also select options within the DCC or elsewhere to send an email to interested parties who have searched the domain name being listed on the domain name aftermarket, so that interested parties are aware of the listing on the aftermarket as soon as it is listed and can make bids. Thus, the domain name may be available to both future customers and those who have logged in and searched the domain name, which has now become available on the aftermarket.

In some embodiments, a domain name registrant may not have an active website associated with the domain name, but the WHOIS data associated with the domain name may show contact information for the registrant, which has not been abstracted by a domain name privacy service. In these embodiments, if a high volume of domain name searches have been logged for the domain name, the contact data in the WHOIS record may be used to notify the user of the high volume of searches. The contact may include a link for the user to access the admin 210. If the user has not already created a user account within the admin, means for creating such an account may be provided, thereby creating a rich source of potential customers to a domain name registrar or the provider of the disclosed service.

The embodiments above are presented from the domain name registrant's perspective. However, other embodiments may be approached from the perspective of the user that searched the domain name.

In these embodiments, the interested party may search a specific domain name, and software 200 may identify the domain name searched and determine if an exact match exists in data storage 130 as previously described. If so, software 200 may identify the user id for the registrant for the domain name portfolio that includes the domain name match and may access any stored contact information for the registrant.

If contact information for the registrant is found, an additional user interface may be displayed to the interested user, allowing them to contact the registrant with an unsolicited offer for the searched domain name. The displayed interface may include means for the interested user to enter an offer price for the domain name. The user input from the user interface may be submitted and transmitted to the contact data associated with the domain name registrant.

The registrant for the searched domain name may receive the offer for the domain name, and if the domain name is a greater value than originally perceived by the registrant, the domain name registrant may recognize the value in the domain name and either begin negotiations via offers and counteroffers for the domain name, or may list it in the domain name aftermarket.

The software may also include logic with heuristics in place to filter out offers below a certain threshold. In these embodiments, a potential buyer cannot send lowball offers that are not worth the seller's time to look at these things In embodiments where the registrant lists the domain name in the domain name aftermarket, the registrant may be provided access to a domain name aftermarket administration tool. In some embodiments, this tool may be available to the user via the DCC, may be accessible via the notice from the interested user of their interest in the domain name or by any other means. The domain name aftermarket administration tool may comprise any administration tools known in the art.

The administrator of the software may mediate any offers/counteroffers for the domain name and the software may be configured to provide a fee to the administrator for negotiating the offer/counteroffer/sale of the domain name, possibly having the registrant pay the costs.

Figure 3:
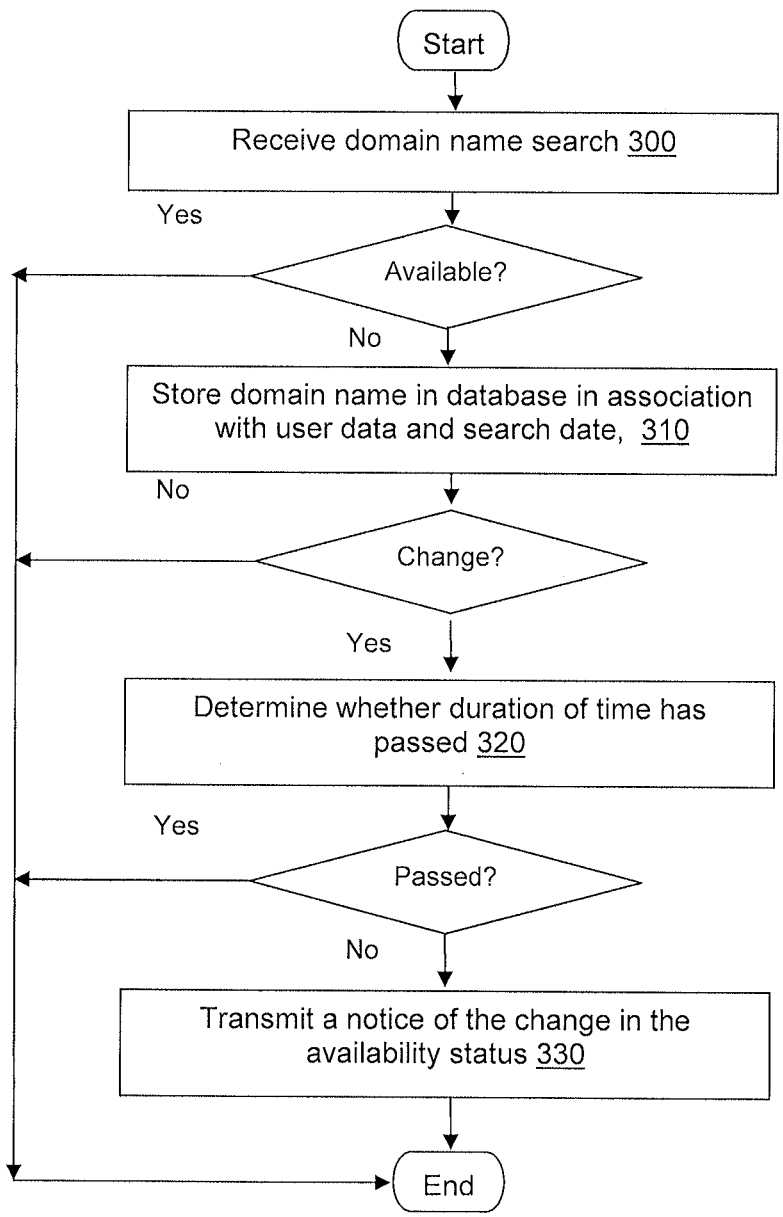
FIG. 3 is a flow diagram illustrating a possible embodiment of a method for notifying interested users when a searched domain name becomes available for registration or purchase.

Several different methods may be used to provide and manage the present systems. FIG. 3 represents a flow diagram for one possible embodiment of the previously described improvements on presently existing systems. In this example embodiment, one or more server computers 110 may be communicatively coupled to the network 100 and may be configured to: receive a search for a domain name (Step 300); query a domain name registration record to determine an availability status of the domain name; responsive to a determination that the availability status of the domain name is unavailable, store in a database communicatively coupled to the network, the domain name in association with a user data record and a search date (Step 310); determine whether a change in the availability status has occurred; and responsive to a determination that the change in the availability status has occurred, determine whether a duration of time since the search date has passed (Step 320), if applicable; and responsive to a determination that the duration of time since the search date has not passed, transmit, to a user contact, a notice of the change in the availability status.

Figure 4:
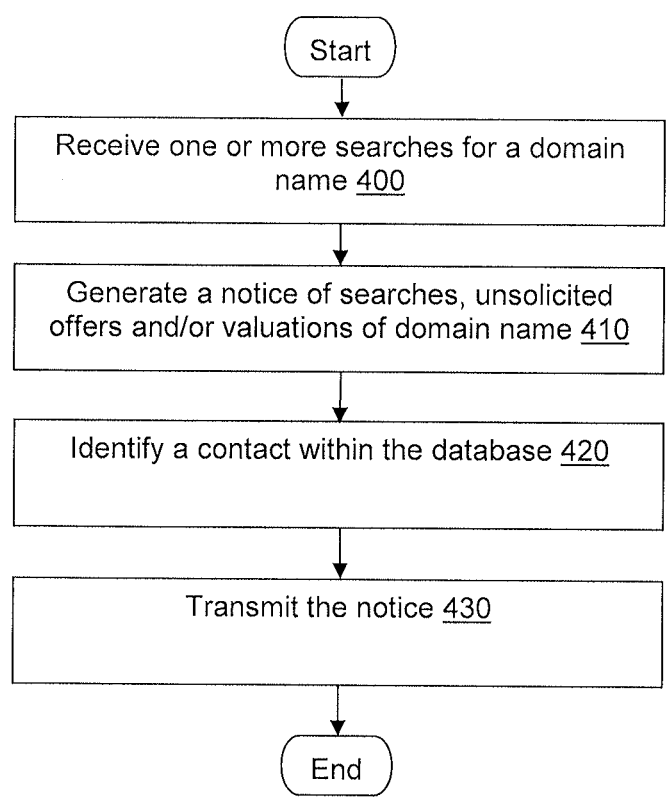
FIG. 4 is a flow diagram illustrating a possible embodiment of a method for notifying interested users when a searched domain name becomes available for registration or purchase.

In other embodiments such as that shown in FIG. 4, the or more server computers 110 may be configured to: receive one or more searches for a domain name (Step 400); generate a notice comprising: the one or more searches; at least one unsolicited offer for the domain name; or a valuation of the domain name based on the at least one search or the at least one unsolicited offer (Step 410); identify the contact data in the database (Step 420); and transmit the notice (Step 430).

The steps included in the embodiments illustrated and described in relation to FIGS. 1-4 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising a server comprising a computing device coupled to a network and including at least one processor executing instructions within a memory which, when executed, cause the system to:
   responsive to a determination that an availability status of a domain name, determined from a domain name registration record, is unavailable:
      identify a user identifier associated with a user operating a client coupled to the network from which a domain name registration request was received, the domain name registration request comprising a token;
      access a domain name registration log to determine a plurality of optimal default values associated with the user identifier and comprising:
         an average time, for a plurality of domain name registrations associated with the user identifier, between the user requesting a registered domain name, and the user registering the registered domain name;

at least one second level domain (SLD), within the plurality of domain name registrations, including the token or at least one synonym of the token; and a top level domain (TLD) that appears most frequently within the plurality of domain name registrations;

store the domain name in association with the user data record and a search date;

determine whether a change in an availability status for the domain name has occurred;

responsive to a determination that the change in the availability status has occurred, determine whether a duration of time since the search date has passed, the duration of time being automatically determined from the average time; and responsive to a determination that the duration of time since the search date has not passed, transmit, to a user contact associated with the user identifier, a notice of the change in the availability status.

2. The system of claim 1, wherein the domain name registration request is aggregated with a plurality of searches into a domain name search log comprising a plurality of domain name search records, each of the plurality of domain name search records comprising:

the user identifier;
a domain name or keyword searched; and
a date of the search.

3. The system of claim 1, wherein the user contact comprises:

an email address;
a number for a text or phone message;
a social media account access data; or
a control panel access data.

4. The system of claim 1, wherein the instructions further cause the system to:

render, transmit and display, on the client communicatively coupled to the network, a graphical user interface (GUI) configured to receive at least one parameter of the notice comprising:
the duration of time;
an amount and format of the notice;
a TLD preference;
an SLD name preference; and
generate and transmit, through the network, the notice based on the at least one parameter.

5. The system of claim 4, wherein the instructions further cause the system to calculate and set an optimal default value for the at least one parameter from at least one domain name search and at least one domain name registration.

6. The system of claim 1, wherein the duration of time is calculated by identifying an average or a longest time period between a domain name search and a domain name registration.

7. The system of claim 4, wherein the amount and format of the notice are determined by:

at least one domain name searched or registered by the user;
a token distance between a plurality of searched or registered domain names;
at least one related or synonymous keyword in the plurality of searched or registered domain names;
a TLD or an SLD in the plurality of searched or registered domain names; or a valuation or aftermarket price for each of the plurality of searched or registered domain names.

8. The system of claim 7, wherein the SLD comprises at least one keyword or a synonym of the at least one keyword in the search.

9. The system of claim 1, wherein the domain name request comprises:

a search string comprising a full domain name; or
at least one keyword.

10. The system of claim 1, wherein the domain name becomes available and the notice is triggered by:

being dropped;
expiring; or
being listed on a domain name aftermarket.

11. A method, comprising the steps of:

responsive to a determination that an availability status of a domain name, determined from a domain name registration record, is unavailable:
identifying, by a server comprising a computing device coupled to a network and including at least one processor executing instructions within a memory, a user identifier associated with a user operating a client coupled to the network from which a domain name registration request was received, the domain name registration request comprising a token;
accessing, by the server, a domain name registration log to determine a plurality of optimal default values associated with the user identifier and comprising:
an average time, for a plurality of domain name registrations associated with the user identifier, between the user requesting a registered domain name, and the user registering the registered domain name;
at least one second level domain (SLD), within the plurality of domain name registrations, including the token or at least one synonym of the token; and
a top level domain (TLD) that appears most frequently within the plurality of domain name registrations;
storing, by the server, in a database communicatively coupled to the network, the domain name in association with a user data record and a search date;
determining, by the server, whether a change in an availability status for the domain name has occurred;
responsive to a determination that the change in the availability status has occurred, determining, by the server, whether a duration of time since the search date has passed, the duration of time being automatically determined from the average time; and
responsive to a determination that the duration of time since the search date has not passed, transmitting, by the server, to a user contact associated with the user identifier, a notice of the change in the availability status.

12. The method of claim 11, wherein the domain name registration request is aggregated with a plurality of searches into a domain name search log comprising a plurality of domain name search records, each of the plurality of domain name search records comprising:

the user identifier;
a domain name or keyword searched; and
a date of the search.

13. The method of claim 11, wherein the user contact comprises:
- an email address;
- a number for a text or phone message;
- a social media account access data; or
- a control panel access data.

14. The method of claim 11, further comprising the steps of:
- rendering, transmitting and displaying, by the server, on the client communicatively coupled to the network, a graphical user interface (GUI) configured to receive at least one parameter of the notice comprising:
  - the duration of time;
  - an amount and format of the notice;
  - a TLD preference;
  - an SLD name preference; and
- generating and transmitting, by the server through the network, the notice based on the at least one parameter.

15. The method of claim 14, further comprising the step of calculating and setting, by the server, an optimal default value for the at least one parameter from at least one domain name search and at least one domain name registration.

16. The method of claim 11, wherein the duration of time is calculated by identifying an average or a longest time period between a domain name search and a domain name registration.

17. The method of claim 14, wherein the amount and format of the notice are determined by:
- at least one domain name searched or registered by the user;
- a token distance between a plurality of searched or registered domain names;
- at least one related or synonymous keyword in the plurality of searched or registered domain names;
- a TLD or an SLD in the plurality of searched or registered domain names; or
- a valuation or aftermarket price for each of the plurality of searched or registered domain names.

18. The method of claim 17, wherein the SLD comprises at least one keyword or a synonym of the at least one keyword in the search.

19. The method of claim 11, wherein the domain name request comprises:
- a search string comprising a full domain name; or
- at least one keyword.

20. The method of claim 11, wherein the domain name becomes available and the notice is triggered by:
- being dropped;
- expiring; or
- being listed on a domain name aftermarket.

* * * * *